June 20, 1944.    J. F. O'BRIEN    2,351,632
POLARIZED OUTLET SECTION FOR ELECTRIC WIRING SYSTEMS
Filed April 27, 1942
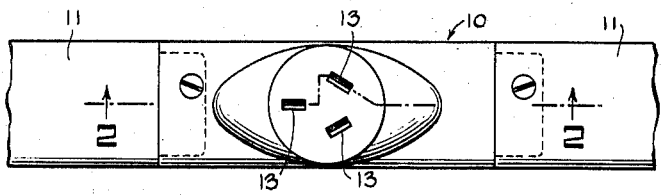
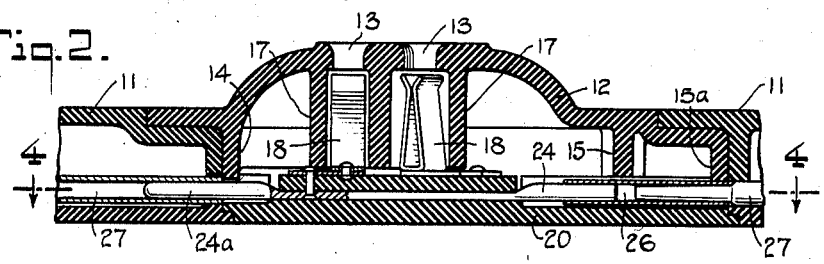
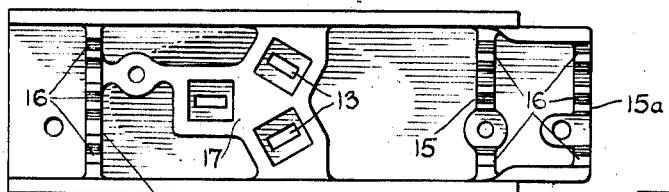
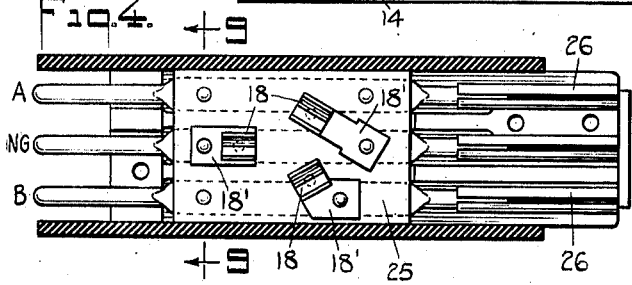
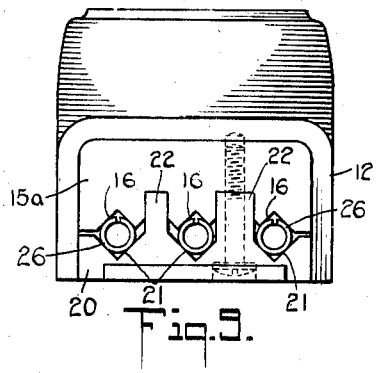
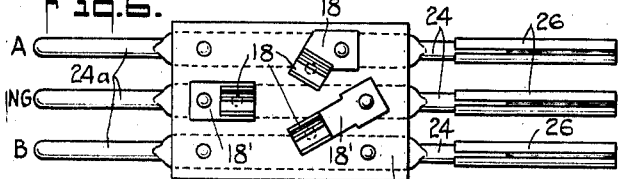
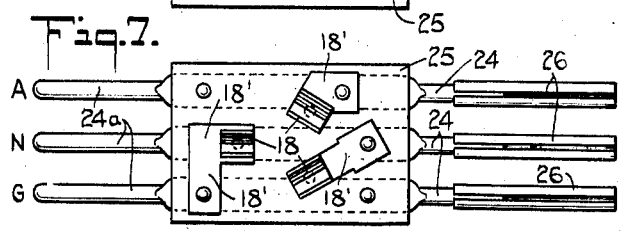
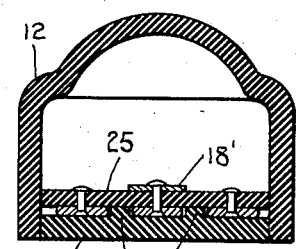
INVENTOR
Joseph F. O'Brien
HIS ATTORNEY Patented June 20, 1944

2,351,632

UNITED STATES PATENT OFFICE 2,351,632

POLARIZED OUTLET SECTION FOR ELECTRIC WIRING SYSTEMS

Joseph F. O'Brien, Jersey City, N. J., assignor to John B. Pierce Foundation, New York, N. Y., a corporation of New York Application April 27, 1942, Serial No. 440,608

6 Claims. (Cl. 173—330)

This invention relates to electric wiring devices, and particularly, to a polarized outlet section providing means for efficiently and safely grounding wiring systems and the exposed metal parts of electrical equipment connected thereto.

This invention is particularly applicable for use with multi-conductor wiring systems and conductor units therefor, such as are described and claimed in my presently co-pending application Serial No. 398,030, entitled Electricity conductor units with conductor-size adjustment.

In such systems, conductor-containing units, comprising a plurality of electricity conductors supported within a non-conductive housing in insulated spaced relationship, are mechanically and electrically interconnected in seriatim to form a circuit of any desired length, with outlet facilities as required.

Conductor units of the type aforesaid eliminate the need for providing ground paths for fault currents which may occur in metallic enclosures, such as B-X cable, metallic bus duct or the like. Where grounded polarized circuits are employed, it is considered the best engineering practice to provide a positive path for fault currents, in the form of a definite low resistance bond between current carrying parts of electrical accessories which might be accidentally touched or contacted by persons, and the "neutral" or grounded wire of the circuit. The grounding of exposed metal parts of equipment which contain live circuit conductors prevents the occurrence of a potential above ground, on such exposed metal parts. With respect to electric circuits per se, the purpose of grounding such a circuit is for limiting a rise in potential above that for which the insulation is designed; or to limit the maximum potential to ground due to normal operating conditions.

By adequately bonding the exposed metal parts of electrical accessory equipment to the "neutral," i. e., grounded, conductor of the circuit supplying such equipment, an assured path to ground for fault currents occurring in exposed metal parts of each piece of electrical accessory equipment is provided; an added advantage is that failure of the path to ground causes an interruption of the circuit, and such a failure is immediately indicated by cessation of performance of the electrical accessory equipment served by the circuit.

An object of the invention, therefore, is to provide a polarized outlet section for an electric wiring system of the type aforesaid, having improved means for grounding the circuit and electric accessory equipment used therewith.

An object of the invention is to provide a polarized outlet section containing provisions for providing adequate protective grounding on a two wire circuit.

An object of the invention is to provide an outlet unit for a three wire 115/230 volt circuit wherein the loads on such a circuit may be balanced, yet adequately and safely grounded.

An object of the present invention is to provide an improved electrical outlet wherein variant grounding and circuit arrangements may be obtained with a minimum of parts, thereby simplifying the manufacture and stocking of conductors, contacts, and housing elements.

Other features and advantages will hereinafter appear.

In the accompanying drawing:

Fig. 1 is a plan view of a portion of a wiring system containing a polarized outlet section embodying the present invention;

Fig. 2 is a vertical section taken on lines 2—2 of Fig. 1;

Fig. 3 is a bottom plan view of the cap member of the improved polarized outlet section;

Fig. 4 is a plan section taken on lines 4—4 of Fig. 2 showing one form of grounding circuit;

Fig. 5 is an elevation of the unitary conductor assembly for the outlet section;

Fig. 6 is a plan view of the unitary conductor assembly showing an optional grounding circuit;

Fig. 7 is another plan view of the unitary conductor assembly, showing a third method of providing for ground connection;

Fig. 8 is an end view of the unit; and

Fig. 9 is a vertical section, taken on lines 9—9 of Fig. 4.

Referring to the drawing for a more detailed description of the invention, the improved polarized outlet unit 10 is shown as electrically and mechanically interconnected with wiring units 11, 11, said units preferably being of the three conductor type described and claimed in my said co-pending application Serial No. 398,030.

Such three conductor units may be connected to the power source to provide a "hot" wire, a "neutral" wire, and a "ground" wire, in which the "neutral" and "ground" conductors may be bonded to a common ground; or a 115/230 volt circuit wherein the conductors are arranged in sequence as a "hot" wire, a combined "neutral" and "ground" wire, and a second "hot" wire. Optionally, one of the conductors may be removed, to provide a two wire circuit comprising a "hot" wire and a combined "neutral" and "ground" wire.

The outlet unit forming the present invention may be employed with any of the above wiring systems to provide means whereby full and complete ground protection is afforded any electrical accessory, such as an electric drill or the like, wherein metal portions which are grasped or contacted by the operator may accidentally be crossed with a "hot" wire of the circuit.

The unit 10 is basically of a three wire type. A cap 12 is provided with three apertures 13 arranged in conformity with the positioning of contact blades of standardized three wire attachment plugs. End walls 14, 15, and 15a of such cap have a plurality of registering notches 16 to receive and position electricity conductors, as later described. Additionally, the cap 12 has a central body formation 17 wherein pockets register with the apertures 13. Such pockets form individual housings for the contact clips 18, see Fig. 2.

Cap 12 is substantially hollow, and is closed by a base member 20, which fits internally thereof. As shown in Fig. 2, the ends of the housing are of male and female configuration to form "broken joint" interconnection with adjacent units 11.

The base 29 is substantially planar, except for grooves 21, 21, 21, at the ends thereof to cooperates with the grooves 16 in the cap member to form angular channels for the securement and uniform positioning of electricity conductors, and upstanding wall formations 22, 22, which interfit, see Fig. 8, with suitable grooves in the end walls of the cap 12. Centrally of the base 20, see Fig. 9, is a pair of relatively low walls 23, which electrically isolate portions of the conductors, as later described.

Positioned upon the base 20 is a unitary conductor organization comprising a plurality—illustratively three, in conformity with the basic three conductor wiring system—of electricity conductors 24 having flattened portions intermediate their ends; the conductors are secured to the underside of a plate 25 of insulating material, said plate being dimensioned to fit snugly between the side walls of the cap 12, as shown in Fig. 9. The flattened portions of the conductors 24 fit between the walls 23 of the base 20, said walls effectively mutually insulating the conductors.

The conductors 24 are desirably of rods or heavy rigid wires. One end, 24a, of each conductor is provided with a tapered or rounded end, and the opposite end is fitted with a split sleeve 26, of phosphor bronze or similar spring material having good conductivity. The sleeves 26 may be soldered or otherwise suitably secured to the conductors.

As shown in Fig. 2, the male end 24a of a conductor fits within a tubular conductor 27 of unit 11, with a tight frictional engagement affording proper electricity conduction. At the opposite end, the sleeve 26 provides a springable socket into which the tapered end of a conductor 27 of the next succeeding unit 11 fits snugly.

The electric contact clips 18 are standardized, and electrically interconnected to the appropriate electricity conductors 24 by suitable bus bars 18', to which the clips are individually connected, and which, in turn, are connected to the conductors 24. Bus bars 18' rest upon the face of insulating block 25 remote from the conductors 24, and may be suitably positioned on said block independently of the positions of such conductors 24.

It is obvious, therefore, that the electricity conductor unit, comprising the respective conductors, the insulating block, and the contact clips, is a readily removable unit, and a conductor unit having variant grounding characteristics may be used with a standardized cap and base member. This facilitates stocking and selection of the units 10, because once the type of grounding circuit is decided upon, the appropriate conductor element may be used with the standardized cap and base member.

Figs. 4 and 6, taken together, represent units affording adequate ground protection, with balanced loads, in a 115/230 volt, three wire system. The center conductor of each of these outlet units is marked "NG," representing combined neutral and ground. In a three wire 115/230 volt system using the circuit arrangement of Fig. 4, therefore, two of the contacts 18 are electrically connected with the "NG" conductor, and the third is connected to "hot" wire B. In this manner, a three wire connection plug may be employed for apparatus requiring 115 volts; the ground path from the apparatus is through the combined neutral and ground conductor of the circuit, to which the third, or grounding, pole of the three pole plug, is connected.

In Fig. 6, a similar arrangement is provided, but "hot" wire A and neutral conductor "NG" form the current supply of conductors, and neutral conductor "NG" serves as the common grounding conductor.

In a 115/230 volt, three wire circuit, therefore, a unit embodying the Fig. 4 circuit and a similar section embodying the Fig. 6 circuit may be used consecutively, thereby balancing the load, because electrical accessories connected to such outlet sections will draw current from the "A—NG" conductors and from the "B—NG" conductors, while maintaining adequate ground connections for the respective pieces of apparatus.

This circuit arrangement has an additional advantage, namely, that so long as current is supplied to the apparatus, the ground connection must necessarily be secure, for if the grounding circuit were broken, the current flow would necessarily be interrupted.

Either the Fig. 4 or the Fig. 6 arrangement may be employed as a two wire, grounded, unit by eliminating conductor A from the Fig. 4 organization or conductor B from the Fig. 6 circuit. In such arrangement, the conductor "NG" serves to provide protective grounding in a two wire circuit. Such arrangement is known as a common ground.

Fig. 7 shows a three wire circuit in which the neutral conductor "N" and the ground conductor "G" are individual circuits, bonded together to a common ground at some convenient point in the wiring circuit.

By positioning the conductors of the unitary conductor organization on the underside of insulating block 25 and the contact clips 18 on the opposite side thereof, the various grounding circuits may be effected with but four forms or shapes of bus bars 18', because a bus bar may be electrically connected to one conductor and swung into position over an adjacent conductor of opposite polarity, cf. Figs. 4 and 6, with no possibility of short circuiting. If, on the other hand, the conductors 24 and bus bars 18' were positioned on the same side of insulating block 25, special insulation means would be required to protect the bus bars 18' against short circuit with conductors of opposite polarity.

Reduction in number and simplification of the bus bars 18' required for achieving the variant grounding circuits effects substantial economies in manufacture and simplifies stocking and warehousing.

Whereas I have described my invention by reference to specific forms thereof, it will be understood that many changes and modifications may be made provided they do not depart from the scope of the claims.

I claim:

1. A polarized outlet section for an electric wiring system, comprising a substantially hollow cap member of insulation material formed with a plurality of apertures in an outer face to individually receive a blade of a polarized attachment plug, said cap member having a plurality of transverse walls provided with mutually registering notches, a base member of insulation material cooperating with said cap member to form an enclosure therefor, said base member having a matching plurality of notches for registry with the notches in said cap member to form longitudinally-extending passages, and unitary conductor means for removable positioning within said housing upon said base, said unitary conductor means including a plate of insulation material, a plurality of electricity conductors positioned in parallel relationship beneath said plate and secured thereto, and electric contact means equal in number to the blades of such polarized attachment plug positioned on the insulating plate and individually electrically connected to selected electricity conductors; the conductors of said unitary conductor means being coextensive with the cap member and individually confined within said passages for maintenance in mutually spaced, insulated, relationship.

2. A polarized outlet section for an electric wiring system, comprising a substantially hollow cap member formed with a plurality of apertures to individually receive a blade of a polarized attachment plug, a base member associated with said cap member to enclose the same, and unitary conductor means for removable positioning within said housing, said conductor means including a plate of insulation material, a plurality of electricity conductors positioned in parallel relationship beneath said plate and secured thereto, and electric contact means for each of the blades of such polarized attachment plug disposed on said plate and electrically connected to selected electricity conductors thereof.

3. A polarized outlet section for an electric wiring system, comprising a substantially hollow cap member, a removable base member therefor, and a unitary conductor means adapted to be removably positioned upon said base for snug confinement within said housing, said unitary conductor means including a plate of insulation material, a plurality of naked conductors secured to the underside of said plate in mutually insulated, spaced relationship, and electric contact means disposed on the upper side of said plate and electrically connected to certain of said conductors; said base member having grooves to individually receive the electricity conductors.

4. A polarized outlet section according to claim 2, wherein the plate of insulation material is dimensioned to fit snugly between side walls of the cap member.

5. A polarized outlet section according to claim 2, wherein the electricity conductors of said unitary conductor means are flattened intermediate their ends to provide a base for the stable securement of said plate of insulation material.

6. An outlet unit for an electric wiring system comprising a housing consisting of a substantially hollow cap section having plug-blade apertures and a removable base plate, and a conductor unit for removable positioning within said housing, said conductor unit comprising a plate of insulation material, a plurality of electricity conductors secured thereto in spaced relationship, said conductors being of such length as to present terminals at the ends of said housing for connection to conductors of the wiring system, and electric contact means disposed on the side of the insulation plate opposite the electricity conductors for registry with apertures in said cap section to receive the blades of an electric attachment plug.

JOSEPH F. O'BRIEN.